US009755447B2

(12) United States Patent
Ries et al.

(10) Patent No.: US 9,755,447 B2
(45) Date of Patent: Sep. 5, 2017

(54) PANEL MOUNTED USB CHARGER (71) Applicants: Brian Joseph Ries, Middlefield, CT (US); Zoltan Bertalan, Vernon, CT (US); Trevor Fitch, Stuart, FL (US)

(72) Inventors: Brian Joseph Ries, Middlefield, CT (US); Zoltan Bertalan, Vernon, CT (US); Trevor Fitch, Stuart, FL (US)

(73) Assignee: Carling Technologies, Inc., Plainville, CT (US)

( * ) Notice: Subject to any disclaimer, the term of this patent is extended or adjusted under 35 U.S.C. 154(b) by 251 days.

(21) Appl. No.: 14/677,661

(22) Filed: Apr. 2, 2015

(65) Prior Publication Data

US 2015/0288208 A1   Oct. 8, 2015

Related U.S. Application Data (60) Provisional application No. 62/022,030, filed on Jul. 8, 2014, provisional application No. 61/975,268, filed on Apr. 4, 2014.

(51) Int. Cl.
*H02J 7/00* (2006.01)

(52) U.S. Cl.
CPC .......... *H02J 7/0044* (2013.01); *H02J 7/0042* (2013.01); *H02J 2007/0062* (2013.01)

(58) Field of Classification Search
CPC . H02J 7/0044; H02J 7/0042; H02J 2007/0062
USPC .................... 439/345, 170, 36; 320/115, 111
See application file for complete search history.

(56) References Cited

U.S. PATENT DOCUMENTS

| 7,914,306 B1* | 3/2011 | Blackwell .......... H01R 13/5213 439/135 |
| 8,842,428 B2* | 9/2014 | Zhou ..................... G06F 1/1632 361/679.41 |
| 9,423,844 B2* | 8/2016 | Strauser .................. G06F 1/266 |
| 9,490,655 B2* | 11/2016 | Cheng ..................... H02J 7/025 |
| 2004/0053525 A1* | 3/2004 | Matsuo ............. H01R 13/5202 439/142 |
| 2006/0181840 A1* | 8/2006 | Cvetko ................... B60R 11/02 361/679.55 |
| 2008/0218799 A1* | 9/2008 | Hiew .................... G06F 1/1632 358/1.16 |

(Continued)

OTHER PUBLICATIONS

Chogori—USB Series—www.chogori.cn pp. 104-106.

(Continued)

*Primary Examiner* — Alexander Gilman
(74) *Attorney, Agent, or Firm* — St. Onge Steward Johnston & Reens, LLC (57) ABSTRACT

A USB charging device that is designed for installation in wet and/or environments where corrosive moisture (e.g., saltwater) are prevalent including a water tight enclosure that includes a door that is biased to a closed position to form a water tight seal over a USB receptacle. The device includes an intermediate seal that seals between the USB receptacles and the power electronics situated in the lower portion of the device. The device is also provided such that the lower portion may be slid into the upper portion to form a mechanical interlock and form an electrical connection between the upper and lower portions while simultaneously forming a water tight seal.

24 Claims, 5 Drawing Sheets

(56) References Cited

U.S. PATENT DOCUMENTS

| | | | |
|---|---|---|---|
| 2008/0266783 A1* | 10/2008 | Mills | G06F 1/1632 361/679.44 |
| 2008/0307144 A1* | 12/2008 | Minoo | G06F 1/1632 710/304 |
| 2009/0032279 A1* | 2/2009 | Gong | H05K 5/0239 174/67 |
| 2009/0295328 A1* | 12/2009 | Griffin, Jr. | H02J 7/0027 320/115 |
| 2011/0084660 A1* | 4/2011 | McSweyn | H01R 13/6675 320/111 |
| 2011/0140656 A1* | 6/2011 | Starr | B60L 11/1816 320/109 |
| 2011/0189888 A1* | 8/2011 | Rhein | H01R 13/65802 439/572 |
| 2012/0019392 A1* | 1/2012 | Yamamoto | H02J 7/0052 340/664 |
| 2013/0088186 A1* | 4/2013 | Hsieh | H02J 7/0054 320/103 |
| 2013/0334065 A1* | 12/2013 | Simmons | A61B 5/14532 205/792 |
| 2014/0328076 A1* | 11/2014 | Firman, II | H01R 13/6675 362/511 |
| 2015/0011108 A1* | 1/2015 | Vanslambrouck | H01R 4/12 439/271 |
| 2015/0288208 A1* | 10/2015 | Ries | H02J 7/0042 320/114 |
| 2015/0340826 A1* | 11/2015 | Chien | F21V 33/00 439/490 |

OTHER PUBLICATIONS

Dual USB Chargers—Blue Sea Systems—Online Brochure—Sales Sheet—www.bluesea.com ; pp. 2.

SeaLink Dual USB Charger and Receptacle—Brochure http://www.marinco.com/en/12vcombo-b ; pp. 2.

Big Biker Parts, Dual Port USB Charger, 2013. [retrieved on Jun. 8, 2015). Retrieved from the Internet: <URL:http://bigbikeparts.com/templates/product.aspx?ProductGuid=13-208&GroupGuid=16#13-208Gallery(pp gal]/O//>. 1 Page.

International Search Report Application No. US 2015 024454 Completed: Jun. 8, 2015; Mailing Date: Jul. 8, 2015 28 pages.

MobileVision. "Multi-Use Vehicle Charger with Dual USB Ports and Dual 12 Volt Sockets—Magnadyne" 2007. [retrieved Jun. 5, 2015]. Retrieved from the Internet: <URL:http://www.amazon.com/Multi-Use-Vehicle-Charger-Ports-Sockets/dp/B000PB8CQI/ref=sr_1_1?ie=UTF8&qid=1437494048&sr=8-1&keywords=Multi-Use+Vehicle+Charger+with+Dual+USB+Ports+and+Dual+12+Volt+Sockets/>. 7 Pages.

* cited by examiner

PANEL MOUNTED USB CHARGER

FIELD OF THE INVENTION

The field relates to a charging outlet for a mobile device, and more particularly, a USB receptacle that is usable in a wet environment and provides for protection of the USB receptacle and associated parts from environmental factors, such as, moisture and corrosive elements.

BACKGROUND OF THE INVENTION

Universal Serial Bus (USB) configured connections have been in use for many years. In particular, the USB connector has become an industry standard for different types of data connections. For example, most personal computers use a USB connection for connecting peripheral devices including, a keyboard, a mouse, external hard drives, touch pads, etc. Additionally, many mobile devices use a USB connector to connect the mobile devices to a computer to facilitate data transfer.

However, the USB connection is not limited to only providing for data transfer. The USB connection may also be used to transfer power to a mobile device for recharging a rechargeable battery. For example, many mobile devices have a charger that includes a cable for connecting to the mobile device at a distal end and connecting to the charger at a proximal end. The end connecting to the charger is typically a USB male connector. The charger includes a USB female connector (receptacle) and may be configured to be plugged into a standard 120V wall outlet, or a power outlet in a vehicle. Alternatively, the USB connector at the proximal end may also be directly connected to a USB receptacle or outlet on a computer and draw power through the computer. USB connections have become so standardized that power cables are becoming a generic commodity that may be obtained in many different locations.

As the use of mobile devices increases and individuals want to be connected at all times, the need to charge mobile devices in various settings is increasing. So while an individual may be able to charge his/her device when 120V outlets are conveniently available or when in their vehicle with the DC outlet available, there are other settings in which individuals don't generally have the ability to charge their mobile devices. For example, if an individual is on a boat, the ability to charge a mobile device is severely restricted. While 120V outlets may be available on some larger boats, the location of those outlets is severely restricted and typically limited to an inside location for safety reasons. This would require the individual to leave his/her mobile device inside the boat to charge, thereby leaving the individual disconnected. Likewise, if an individual is on a golf course, the availability to charge a mobile device is typically not available requiring the individual to leave his/her mobile device in the club house. These two settings in particular, are challenging to provide for mobile device charging as they are subject to environmental elements including rain and wind, as well as corrosion, especially in the case of a boat navigating on a body of salt water.

Exterior 120V outlets have been in use for many years. For example, exterior outlets are often provided on residences that are Ground Fault Circuit Interrupt (GFCI) protected and include a plastic cover mounted on a rain tight box to keep moisture off of the outlet. However, a problem with these types of outlets is that, while the plastic cover and the box itself provides some protection from rain and water getting onto the outlet, the covers are often left open after use undermining the "waterproof" nature of the installation. Additionally, the equipment inserted into the box is often a standard outlet and moisture that does penetrate the outlet due to, for example, the cover being left open, can travel to the interior of the outlet and cause the device to trip. In other words, beyond the plastic cover and a gasket provided on an exterior of the box, there is nothing else that is waterproof about the installation.

With respect to power outlets on boats, these are typically located inside the boat as the corrosive nature of saltwater will often quickly destroy electrical contacts and metal parts.

SUMMARY OF THE INVENTION

What is desired then is a system that allows for charging of a mobile device in a safe and reliable manner in an exterior setting.

It is further desired to provide a charging station for a mobile device that uses a standard USB connector in an exterior setting.

It is still further desired to provide a system for charging a mobile device in an environment where corrosive elements are present.

Finally, it is desired to provide a system for charging a mobile device that uses a standard USB connector on a boat or a golf cart.

These and other objects are achieved by the provision of a panel mounted USB charger that is designed for exterior wet locations and locations in and around salt water. The above objects may be achieved by a USB charger having a base, a bracket, a cover, a seal, at least one USB receptacle, a door covering the at least one USB receptacle, a spring (in one example, a double torsion spring) maintained within the cover and the door, at least one Printed Circuit Board (PCB) and a PCB gasket seal.

In other embodiments, the panel mounted USB charger may comprise a second: PCB, door, seal, USB receptacle and spring. Additionally, the USB charger may also include an LED and a light pipe having a waterproof end that will indicate that the device is successfully connected to the charger.

Still further, the base may comprise a molded waterproof material and be sealingly attached to the bracket (also a molded waterproof material) to form a watertight enclosure. The base may be provided with one or more terminals at a bottom end for providing electrical power to one or more of the PCBs. It is contemplated that the base may further be provided with additional terminals that extend beyond the base and function as a heat sink for a PCB maintained within the base.

In the example where the panel mounted USB charger comprises two PCBs, one within the base, and one within the bracket, it is contemplated that a PCB gasket seal may be provided between the two PCB's to ensure that any water that may makes its way into the bracket cannot infiltrate into the base.

Additionally, the cover may be provided as a molded waterproof material that is capable of being sealingly affixed to the top of the bracket. A door is provided coupled to the cover with a spring being maintained within the cover and the door such that when closed, the spring is within the watertight enclosure. In this manner, if the panel mounted USB charger is mounted on a boat (e.g., on an exterior panel adjacent to the boat controls), if the door is closed, the spring, which may be formed as a metal composite, will not be exposed to corrosive salt water impingement except when the door is actually opened. Likewise, the USB receptacle that is positioned within the bracket will be similarly protected within the watertight enclosure.

The spring may be positioned such that, when a USB plug is not inserted into the receptacle, the spring biases the door to a closed position to completely seal the device. It is further contemplated that an elastomer seal may be positioned around the USB receptacle to provide a watertight seal when the spring biases the door closed and engages with the elastomer seal.

In one example, a first PCB board is mounted within the bracket such that two USB receptacles are positioned and electrically connected to the first PCB board. The first PCB board may further be electrically connected to a second PCB board that is mounted within the base. It is contemplated that a seal is provided between the first and the second PCB boards. The two USB receptacles may be positioned such that the openings in the receptacles are facing upward toward the top of the bracket. The cover is provided to enclose the top of the bracket and retain the elastomer seal. The cover may also include two openings for the two USB receptacles. An elastomer seal is provided formed around the two openings in the bracket and cover, which is designed to engage with two doors that are biased to a closed position by two springs. The panel mounted USB charger may be mounted in an opening provided in a relatively flat surface (e.g., on a control panel surface of a boat or on a relatively flat surface on a golf cart, etc.) and is provided with a gasket to seal the device relative to the opening in the flat surface where it is mounted.

Terminals may be provided extending from a bottom portion of the base to be coupled to electrical wires connected to a DC voltage source (e.g., a battery, such as a boat battery or a golf cart battery).

In this manner, once the panel mounted USB charger is installed, the charger will be positioned such that the base, and a majority of the bracket are maintained within the panel enclosure of the boat or golf cart, etc. A panel seal positioned between the device and the panel inhibits moisture from leaking around the device and entering the enclosure through the opening provided for the device. A portion of the bracket, the cover and the doors will be maintained outside the enclosure and exposed to the elements. However, due to the elastomer seals engaging with the doors that are biased to a closed position, the USB receptacles housed within the bracket will be maintained within the watertight device and protected from damage due to environmental factors. To access the USB receptacle(s), an individual need only raise one of the doors and plug the USB plug into the receptacle. When the device is finished charging, the USB plug may be removed, at which time the door will automatically close due to the bias applied by the spring.

For this application the following terms and definitions shall apply:

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term "water tight" as used herein means substantially impervious to water.

In one advantageous embodiment a USB charging device is provided comprising, a base and a bracket, where the bracket is attached with the base. The charging device further comprises a cover attached to the bracket in a water tight manner and having at least one opening formed therein. The charging device also comprises at least one door, at least one hinge affixing the at least one door to the cover, and a biasing mechanism for biasing the at least one door in a closed position with respect to the cover. The charging device still further comprises a seal formed around the at least one opening for form a water tight seal with the at least one door when the door is in the closed position, at least one Universal Serial Bus (USB) receptacle accessible via the at least one opening in the cover, and at least one Printed Circuit Board (PCB) electrically connected to the at least one USB receptacle. The charging device is provided such that the bracket has a mounting portion for engaging with a surface for mounting of the USB charging device in an exterior environment.

In another advantageous embodiment a USB charging device is provided comprising, a base and a bracket, where the bracket is attached with the base. The charging device further comprises a cover attached to the bracket in a water tight manner and having at least two openings formed therein. The charging device also comprises at least two doors, at least two hinges each affixing one of the at least two doors to the cover, and at least two biasing mechanisms, each biasing one of the at least two doors to a closed position with respect to the cover. The charging device still further comprises a seal formed around the at least two openings forming a water tight seal with the at least two doors when each door is in the closed position, at least two Universal Serial Bus (USB) receptacles each accessible via one of the at least two openings in the cover, and at least one Printed Circuit Board (PCB) electrically connected to the at least two USB receptacles. The charging device is provided such that the bracket has a mounting portion for engaging with a surface for mounting of the USB charging device in an exterior environment.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
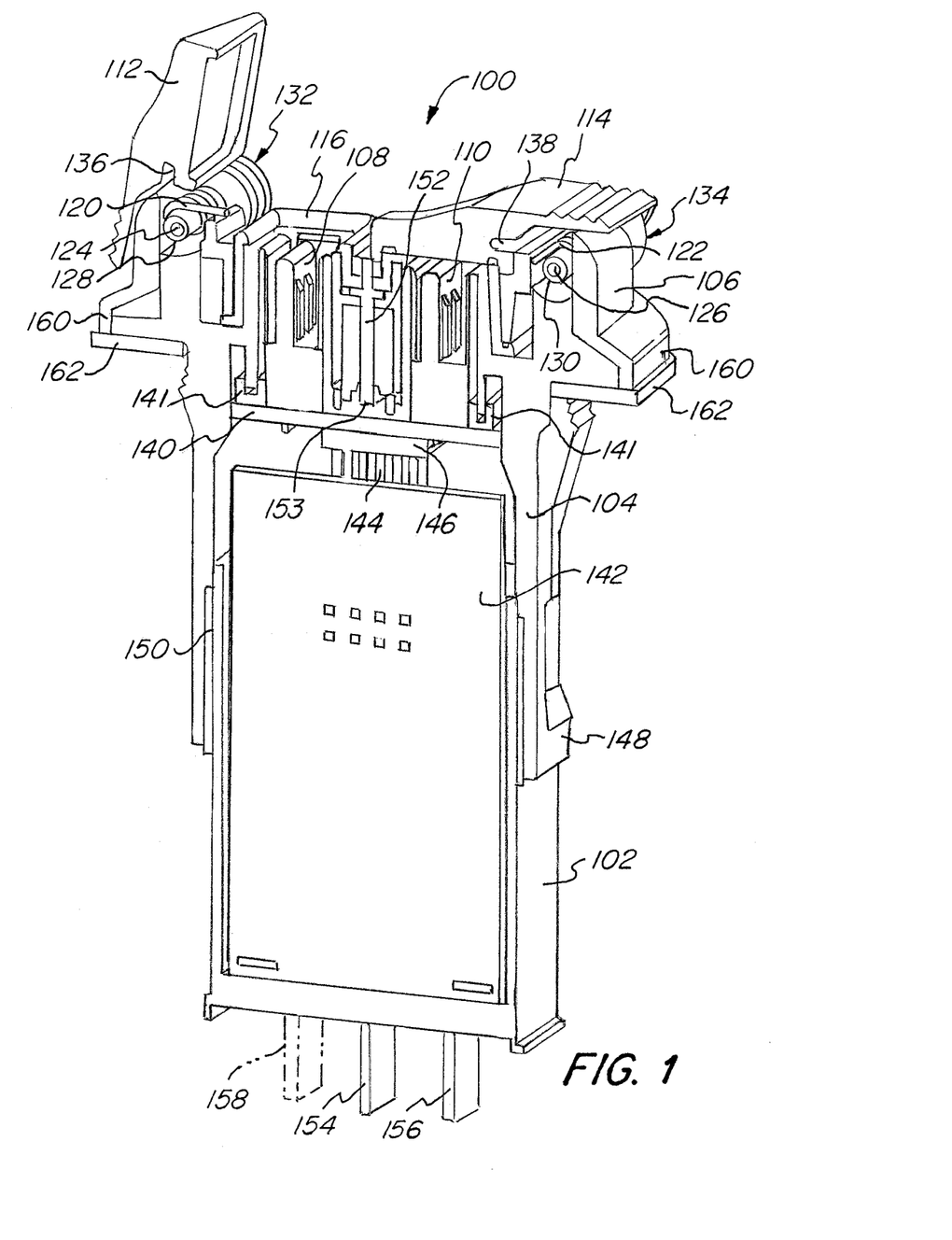
FIG. 1 is a perspective cut away view of the charger.

FIG. 1 depicts a USB charging device 100 that is designed for use in an exterior environment in a cut away view to illustrate the contents of the device. The USB charging device 100 includes a base 102 that serves as a lower piece for the housing and is connected to bracket 104, which serves as an upper piece for the housing. It is contemplated that both the base 102 and the bracket 104 may be formed comprising a molded plastic material and are affixed to each other in a water tight manner.

Also provided is a cover 106 that also may comprise a molded plastic material and is designed to snap onto bracket 104 in a water tight manner. While it is conceived that the cover 106 may be formed to be affixed to the bracket 104 via a frictional fit (e.g., formed with a protrusion to interact with an undercut); however, it is conceived that the mechanical fixation may be by virtually any means, including, for example, but not limited to screws. The cover 106 is provided with at least two openings provided in an upper part of cover 106 to allow access to USB receptacles 108, 110 positioned within bracket 104 (e.g., standard USB 2.0, Type A receptacles).

Doors 112, 114 are illustrated as being positioned on the upper part of cover 106 being deflectable between an opened and a closed position relative to each opening. The doors 112, 114 may also comprise a molded plastic material. Elastomeric seal 116 is illustrated positioned around the respective openings provided in the upper part of cover 106. The elastomeric seal 116 is designed to interact with each respective door 112, 114 to form a water tight seal when doors 112, 114 are in the closed position. One of skill in the art will understand that while one continuous elastomeric seal 116 is illustrated, two elastomeric seals may be provided, one for each opening.

Also depicted in FIG. 1 are springs 120, 122 each respectively positioned partly within the cover 106 and doors 112, 114. In one example, the springs 120, 122 may be provided as double torsion springs. Each of doors 112, 114 is provided with a pin 124, 126 that are designed to engage with openings 128, 130 provided in cover 106 for form hinges 132, 134 respectively (rivets, spring coiled pins and slotted pins may effectively be used for each hinge pin). Each door 112, 114 is provided with a cavity 136, 138 that is designed to receive one end of each respective spring 120, 122. The springs 120, 122 are each wound around the pins 124, 126 for each respective door 112, 114 to form a biasing mechanism that biases each door 112, 114 to the closed position. In this manner, when nothing is inserted into the USB receptacles 108, 110, the doors 112, 114 will be biased closed to form a water tight seal preventing moisture or other elements from entering the USB charging device 100. This is highly desirable in wet environments (e.g., exterior locations such as positioned on a golf cart), or in environments where corrosive elements may be present (e.g., on an exterior control panel of a boat where salt water and salt spray may be prevalent).

Likewise, springs 120, 122 may be provided comprising a metal or metal composite. The manner in which springs 120, 122 are fully contained within the enclosure when the doors 112, 114 are closed preventing the springs 120, 122 from being overly exposed to moisture and/or corrosive elements allowing the biasing mechanism to remain effective for a longer period of time.

Also illustrated in FIG. 1 is PCB 140 electrically connected to each of USB receptacles 108, 110. While bracket 104 is shown supporting PCB 140, it is contemplated that PCB 140 could be positioned in different locations. An intermediate seal 141 is also illustrated in FIG. 1 providing a seal from an upper surface of PCB 140 (i.e., the surface facing receptacles 108, 110) to a lower surface of PCB 140 (i.e., the surface facing toward PCB 142). In this manner, if moisture where to penetrate the cover 106 and infiltrate into the upper part of bracket 104 via receptacles 108, 110, the moisture is prevented from penetrating further into the base 102 where the power conversion occurs on PCB 142. Accordingly, the USB charging device 100 provides a double sealing arraignment, the first being the seal surrounding the openings in the cover 106 to interact with each of the doors 112, 114; and the second being the intermediate seal 141 that forms a water tight seal between the two PCB boards.

PCB 142 is shown positioned in base 102 and is electrically connected to PCB 140. It is contemplated that PCB 142 is provided with a terminal 144 that is electrically coupleable to a terminal 146 associated with PCB 140 such that the base 102 and the bracket 104 may be attached to each other mechanically and the terminals 144, 146 electrically couple PCB 140 with PCB 142. In one example, terminals 144, 146 comprise an edge connector and receptacle arraignment. In another example, the coupling is a wired arraignment.

In one example, the first and second terminals may comprise an edge connector and receptacle arraignment such that the first and second terminals are detachably electrically coupled to each other. In this arraignment, PCB 140 may be positioned in bracket 104 and PCB 142 may be positioned in base 102. An upper portion of the base 102 may be slid into a lower portion of bracket 104 such that, when the base 102 and bracket 104 are fully slid together, the terminals 144, 146 are electrically connected to each other and the base 102 mechanically interlocks with the bracket 104. The interlock may comprise, for example, a deflectable portion 148 and engages with an undercut 150. In this manner, assembly of the device is simple as the base simply slides into the bracket. In any event, the base 102 and bracket 104 form a water tight assembly.

Figure 3:
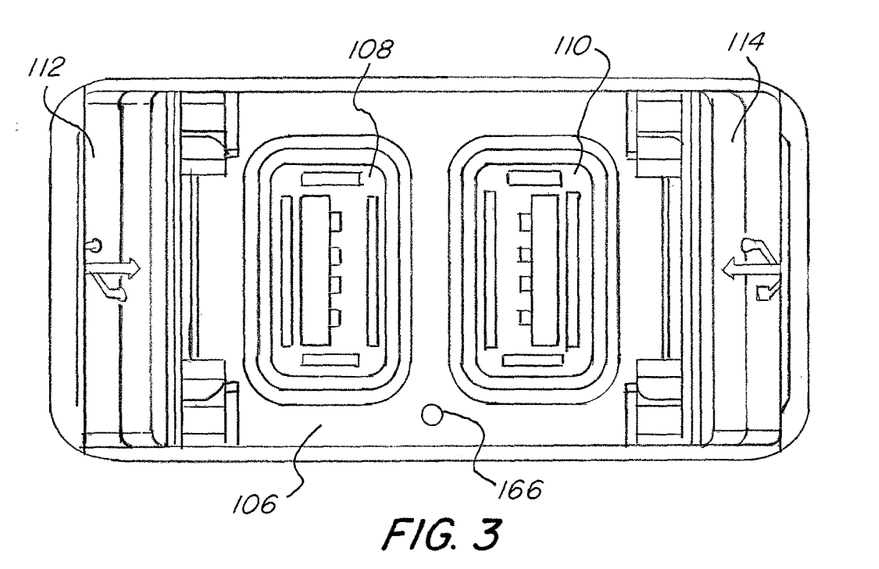
FIG. 3 is a top view of the charger according to FIG. 1 illustrating the doors in an open position.

Also illustrated in FIG. 1 is a light pipe 152 that extends from PCB 140, through the bracket 104 and exits through cover 106 and terminates at end 166 (FIG. 3). A light source 153 may be positioned on PCB 140 to generate light to be transmitted via light pipe 152 to provide a visual feedback to a user that a USB plug is inserted into one of the receptacles and the attached device is charging. In one example, the light source may comprise an LED and the light pipe 152 may comprise a fiber optic cable. The light emitting from the end of the light pipe 152 may be green when a device is plugged in and charging or may alternately toggle to red if no charging is occurring. In this case, there would be two light sources provided (e.g., one green LED and one red LED) and/or one or two light pipes may be provided (e.g., one light pipe for both LEDs or one light pipe for each LED). Circuitry could be provided for measuring current flow through either of the receptacles to determine if a connected device is charging. Likewise, it is contemplated that multiple LED indicators could be provided separately for each receptacle. It is contemplated that many differing schemes could be provided to provide visual feedback to a user to determine if their device is charging and/or when the device is fully charged.

Positioned at a lower portion of base 102 are terminals 154, 156, which are power terminals for PCB 142. It is contemplated that terminals 154, 156 may be electrically connected to a DC power source (e.g., battery power in a boat or a golf cart, etc.). Also depicted in FIG. 1 is another terminal(s) 158 that is shown in dashed line to indicate this is optional, which terminal 158 is provided as a heat sink(s) for PCB 142.

In operation, it is conceived that PCB 142 is provided as the power conversion board receiving power from, for example, a DC power source, and converts the received electrical power to a format that is transferred to PCB 140 to each USB receptacle 108, 110 respectively. Electronics provided on PCB 142 provide for reverse polarity, short circuit, thermal overload and load dump protections. Also included are controller chips providing the protocols to automatically detect the correct electrical signatures of compliant devices and charge them according to their capabilities.

Finally, bracket 104 is provided with a mounting portion 160 that is designed to engage with a surface (not shown) that the USB charging device 100 is mounted to (i.e., a relatively flat panel on a boat or golf cart). The mounting portion 160 is provided with a seal 162 that interacts with the mounting surface to form a water tight seal so that moisture and/or corrosive elements do not penetrate into the inside of the structure on which the USB charging device 100 is mounted and where the terminals 154, 156 are located. It is contemplated that the USB charging device 100 is fully water tight when the doors are closed such that it may be completely submerged in water and maintain the inside of the device free of moisture.

Figure 2:
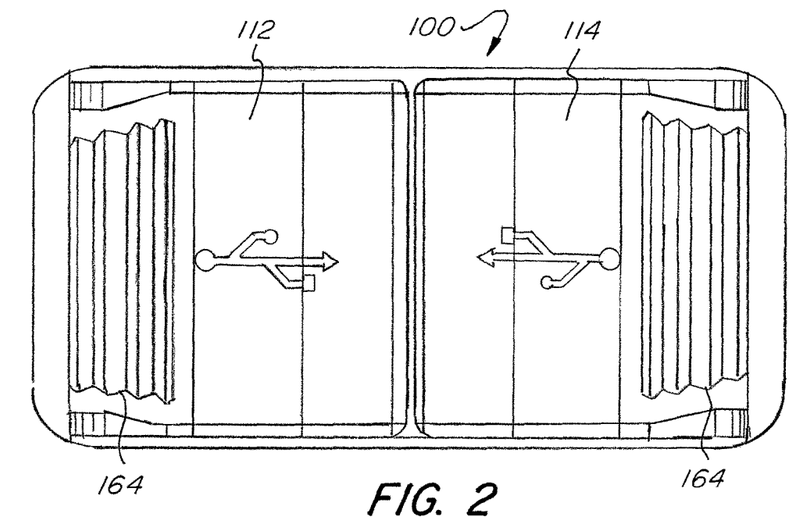
FIG. 2 is a top view of the charger according to FIG. 1 illustrating the doors in a closed position.

FIGS. 2 and 3 are top views of the USB charging device 100 with FIG. 2 showing the doors 112, 114 in the closed position and FIG. 3 showing the doors 112, 114 in the opened position. As can be seen in FIG. 2, the doors 112, 114 are each provided with a plurality of protrusions 164 that provide a surface the is easy to engage to open each door 112, 114.

FIG. 3 shows a top view of receptacles 108, 110 with the doors 112, 114 opened for insertion of a USB plug. The end 166 of the light pipe 152 is also illustrated on an upper surface of cover 106 to indicate when a device is plugged in and charging.

Figure 4:
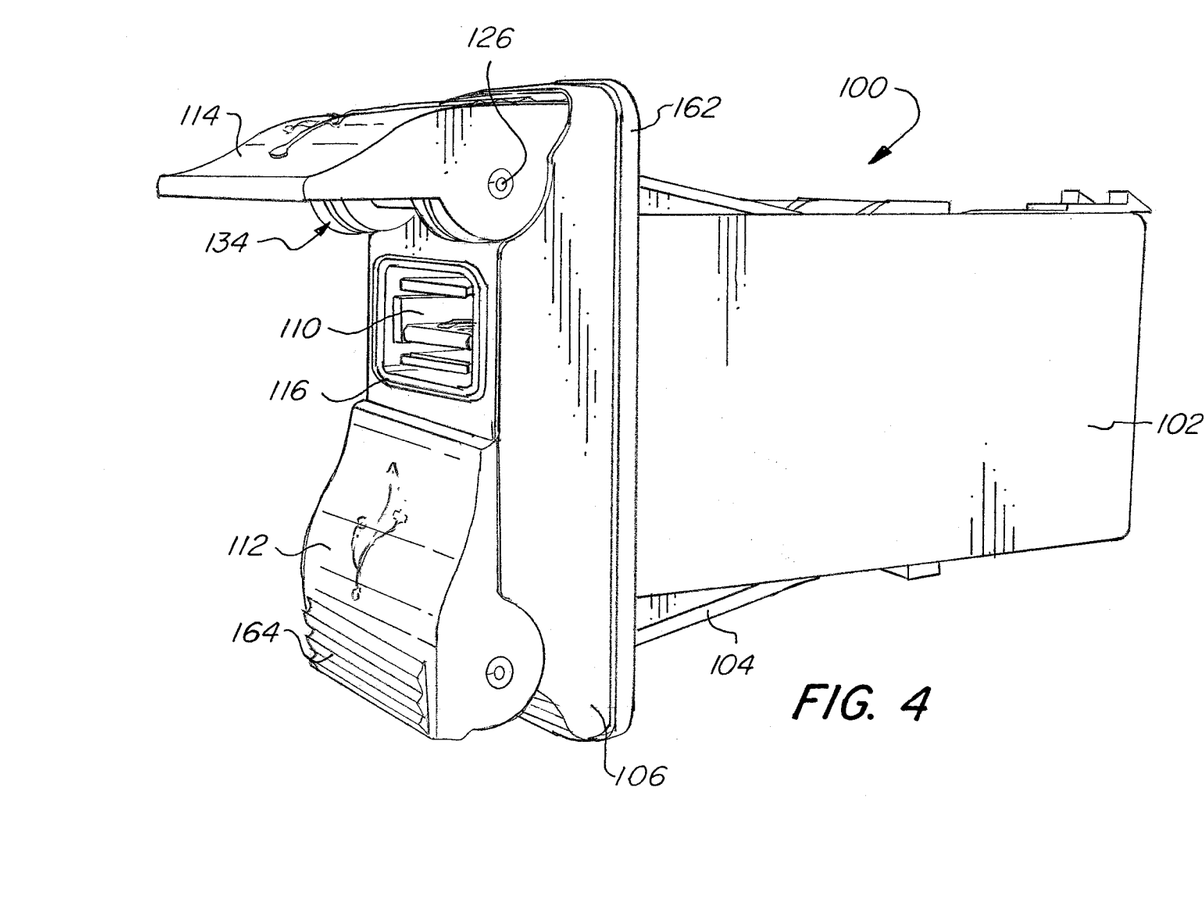
FIG. 4 is a perspective view of the charger according to FIG. 1.

FIG. 4 is a perspective view of the USB charging device 100 showing the exterior including the base 102, the bracket 104, the cover 106, the doors 112, 114 and the seal 162. Door 114 is lifted to illustrate the USB receptacle 110, the seal 118, and the spring 112. As can be seen, when the door is closed, a water tight seal is formed such that moisture is not able to penetrate into the interior of the USB charging device 100. This is advantageous in exterior installations that may become wet (e.g., a golf cart) or exterior installations where corrosive air and moisture may be present (e.g., on a boat).

Figure 5:
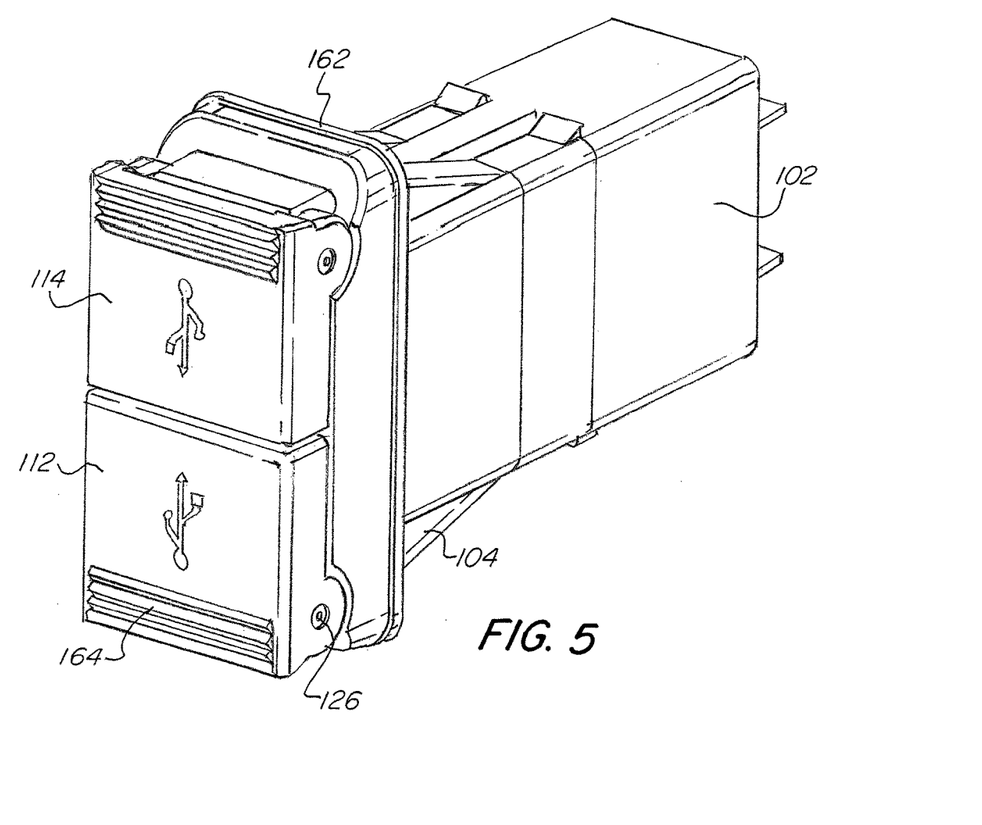
FIG. 5 is a perspective view of the charger according to FIG. 1 with an alternate door design.

FIG. 5 is similar to FIG. 4 but shows an alternate door configuration for USB charging device 100. The doors 112, 114 in FIG. 5 when in a closed position, present a substantially flat surface area rather than a curved surface area according to FIG. 4.

Figure 6:
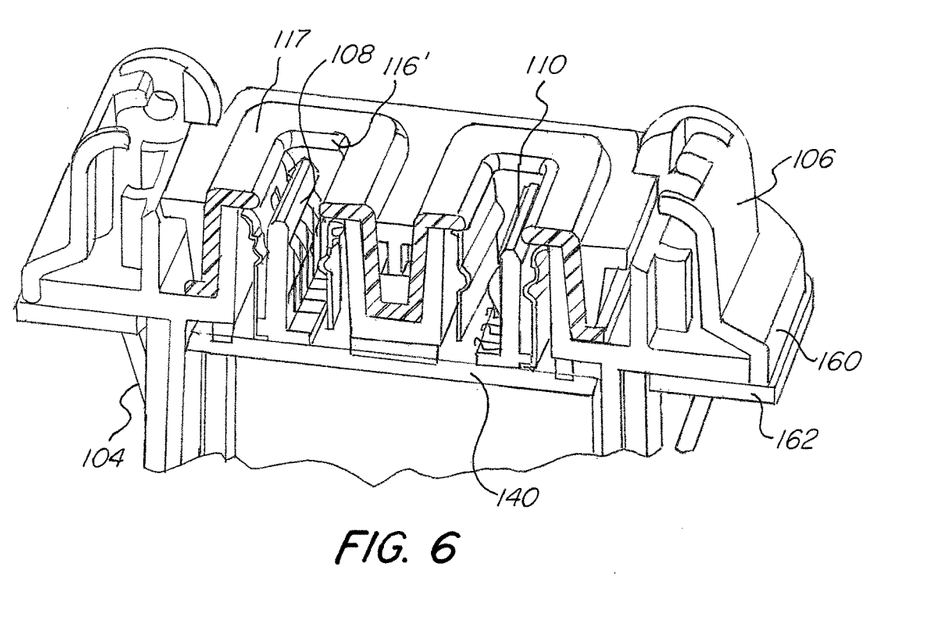
FIG. 6 is a perspective view of the charger according to FIG. 1 with an alternate seal design.

Likewise, FIG. 6 provides an alternate embodiment for the seal 116 shown in connection with FIG. 1. In this case, seal 116' is provided such that an upper edge 117 of the seal 116' extends over an outer perimeter edge of each of receptacles 108, 110. In this manner, when the door 112, 114 or a respective USB receptacle 108, 110 is open and a USB plug is inserted into the receptacle, the seal 116' extends over the perimeter edge of the receptacle to contact an outer surface of the USB plug to form a seal preventing water from entering the receptacle. It is contemplated that the seal 116' may, in one example, comprise an elastomeric seal that is deformable to provide a tight seal between the upper edge 117 and the outer surface of the USB plug.

It is further understood that the upper edge 117, especially with constant and repeated use such as may be see in a golf cart, may be subject to wear. As such, it is conceived that the cover 106 may be provided as a snap on attachment to the bracket 104 to allow for a relatively quick and easy removal and replacement of the seal 116' if such becomes necessary.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A USB charging device comprising:
    a base;
    a bracket;
    said bracket attachable with said base;
    a cover attached to said bracket in a water tight manner and having at least one opening formed therein;
    at least one door;
    at least one hinge affixing said at least one door to said cover;
    a biasing mechanism for biasing said at least one door in a closed position with respect to said cover;
    a seal formed around said at least one opening for forming a water tight seal with said at least one door when the door is in the closed position;
    at least one Universal Serial Bus (USB) receptacle accessible via the at least one opening in said cover;
    at least one Printed Circuit Board (PCB) electrically connected to said at least one USB receptacle, wherein said at least one PCB comprises a first PCB and a second PCB, said first PCB being electrically connected to said second PCB, said charging device further comprising an intermediate seal formed between said first PCB and said second PCB such that moisture is inhibited from moving from an area housing said first PCB to an area housing said second PCB;
    said bracket having a mounting portion for engaging with a surface for mounting of said USB charging device in an exterior environment.

2. The USB charging device according to claim 1 wherein said cover has two opening formed therein and said at least one USB receptacle comprises two USB receptacles, each USB receptacle having a door and a hinge and a biasing mechanism for biasing each door to a closed position relative to said cover, said seal formed around each opening, and wherein both of said USB receptacles are electrically connected to said at least one PCB.

3. The USB charging device according to claim 1 further comprising at least two terminals extending from said base for connecting to an electrical power source.

4. The USB charging device according to claim 3 further comprising at least one additional terminal extending from said base functioning as a heat sink.

5. The USB charging device according to claim 1 wherein the first PCB is provided with a first terminal and the second PCB is provided with a second terminal, the first terminal being electrically coupleable with the second terminal.

6. The USB charging device according to claim 5 wherein the first and second terminals comprise an edge connector and receptacle arraignment such that the first and second terminals are detachably electrically coupled to each other.

7. The USB charging device according to claim 6 wherein when an upper portion of the base and a lower portion of the bracket are advanced fully together the base and bracket form a mechanical interlock and the first and second terminals form an electrical connection.

8. The USB charging device according to claim 1 further comprising a light source and a light transmitter terminating at cover, said light transmitter emitting light generated by said light source when a device is successfully coupled to said USB receptacle and charging.

9. The USB charging device according to claim 8 wherein said light source comprises a Light Emitting Diode (LED) and said light transmitter comprises a fiber optic cable.

10. The USB charging device according to claim 1 wherein said at least one hinge includes a pin engaged with an opening, and said biasing mechanism comprises a spring.

11. The USB charging device according to claim 10 wherein said spring is wound around said pin and engages with said at least one door and said cover such that said spring is maintained within the water tight enclosure when the door is closed.

12. The USB charging device according to claim 11 wherein said spring comprises a double torsion spring.

13. The USB charging device according to claim 12 wherein said at least one door includes a cavity located therein for receiving one end of said spring.

14. The USB charging device according to claim 1 further comprising a panel seal for sealing said USB charging device relative to the surface it is affixed to.

15. The USB charging device according to claim 1 wherein said base, bracket, cover and door each comprise a molded plastic material.

16. The USB charging device according to claim 1 wherein said seal includes an upper portion that extends around and over an outer peripheral edge of said USB receptacle such that when a USB plug is inserted into said USB receptacle, the upper portion of said seal contacts an outer part of the USB plug to form a seal preventing water from entering said USB receptacle when said door is open.

17. A USB charging device for use in exterior environments, said charging device comprising:
a base;
a bracket;
said bracket attachable with said base;
a cover attached to said bracket in a water tight manner and having at least two openings formed therein;
at least two doors;
at least two hinges each affixing one of said at least two doors to said cover;
at least two biasing mechanisms, each biasing one of said at least two doors to a closed position with respect to said cover;
a seal formed around said at least two openings forming a water tight seal with said at least two doors when each door is in the closed position;
at least two Universal Serial Bus (USB) receptacles each accessible via one of the at least two openings in said cover;
at least one Printed Circuit Board (PCB) electrically connected to said at least two USB receptacles, wherein said at least one PCB comprises a first PCB and a second PCB, said first PCB is electrically connected to said second PCB, said charging device further comprising an intermediate seal formed between said first PCB and said second PCB such that moisture is inhibited from moving from an area housing said first PCB to an area housing said second PCB;
said bracket having a mounting portion for engaging with a surface for mounting of said USB charging device in an exterior environment.

18. The USB charging device according to claim 17 wherein the first PCB is provided with a first terminal and the second PCB is provided with a second terminal, the first terminal being electrically coupleable with the second terminal.

19. The USB charging device according to claim 18 wherein the first and second terminals comprise an edge connector and receptacle arraignment such that the first and second terminals are detachably electrically coupled to each other.

20. The USB charging device according to claim 19 wherein when an upper portion of the base and a lower portion of the bracket are advanced fully together the base and bracket form a mechanical interlock and the first and second terminals form an electrical connection.

21. The USB charging device according to claim 17 wherein said at least two hinges each include a respective pin engaged with a respective opening, and said at least two biasing mechanisms each comprise a double torsion spring.

22. The USB charging device according to claim 21 wherein each of said springs is wound around each respective pin, each spring engaging with a cavity located in each respective door such that each spring biases each respective door to a closed position relative to said cover.

23. The USB charging device according to claim 17 wherein said base, bracket, cover and two doors each comprise a molded plastic material.

24. The USB charging device according to claim 17 wherein said seal includes an upper portion that extends around and over an outer peripheral edge of said at least two USB receptacles such that when a USB plug is inserted into a respective one of said at least two USB receptacles, the upper portion of said seal contacts an outer part of the USB plug to form a seal preventing water from entering said respective USB receptacle.

* * * * *